(12) United States Patent
Allen et al.

(10) Patent No.: US 8,610,972 B2
(45) Date of Patent: Dec. 17, 2013

(54) OPTICAL SYSTEM FOR A SCANNER INCLUDING A LIGHT SOURCE FOR ILLUMINATING A TARGET AREA AND A PLURALITY OF MIRRORS POSITIONED TO RECEIVE A LIGHT BEAM

(71) Applicant: Lexmark International, Inc., Lexington, KY (US)

(72) Inventors: Eugene David Allen, Richmond, KY (US); Chengwu Cui, Lexington, KY (US); Joshua Tyler Strow, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 13/674,195

(22) Filed: Nov. 12, 2012

(65) Prior Publication Data
US 2013/0070317 A1 Mar. 21, 2013

Related U.S. Application Data

(63) Continuation-in-part of application No. 12/979,685, filed on Dec. 28, 2010, now abandoned.

(51) Int. Cl.
  *H04N 1/04* (2006.01)

(52) U.S. Cl.
  USPC ..... 358/475; 358/474; 359/208.1; 359/219.2; 359/204.1; 359/201.1

(58) Field of Classification Search
  USPC .................................................. 358/474–475
  See application file for complete search history.

(56) References Cited

U.S. PATENT DOCUMENTS

| | | | |
|---|---|---|---|
| 6,172,784 B1 * | 1/2001 | Konda | 359/196.1 |
| 2007/0177223 A1 * | 8/2007 | Kim | 358/474 |

* cited by examiner

Primary Examiner — Qian Yang
Assistant Examiner — Marcellus Augustin

(57) ABSTRACT

An optical system for a scanner according to one example embodiment includes a light source for illuminating a target area and a plurality of mirrors that includes a first mirror positioned to receive a light beam traveling along a first optical path and to reflect the beam along a second optical path. A second mirror receives the beam traveling along the second optical path and reflects the beam along a third optical path. A third mirror receives the beam traveling along the third optical path and reflects the beam along a fourth optical path. A fourth mirror receives the beam traveling along the fourth optical path and reflects the beam along a fifth optical path. A fifth mirror receives the beam traveling along the fifth optical path and reflects the beam along a sixth optical path. An image sensor receives the beam and senses an image of the target area.

18 Claims, 2 Drawing Sheets

OPTICAL SYSTEM FOR A SCANNER INCLUDING A LIGHT SOURCE FOR ILLUMINATING A TARGET AREA AND A PLURALITY OF MIRRORS POSITIONED TO RECEIVE A LIGHT BEAM

CROSS REFERENCES TO RELATED APPLICATIONS

This patent application is a continuation-in-part application of U.S. patent application Ser. No. 12/979,685, filed Dec. 28, 2010, entitled "Optical System for a Scanner Including a Plurality of Mirrors."

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to scanners, and more specifically, to an optical system for a scanner.

2. Description of the Related Art

A typical scanner includes one or more scan heads. A first scan head design employs an array of thin rod lenses to form a line image onto a 1:1 ratio sensor array, referred to as a contact image sensor. A second scan head design employs folding mirrors to form a reduced image via a lens onto a sensor array and is often referred to as an optical reduction system. The optical reduction system holds many advantages over the contact image sensor in terms of image quality. However, a scan head having an optical reduction system is typically bulkier than a scan head having a contact image sensor. Further, too many reflections may result in undesired ghosting of the scanned image.

Conventional document scanners may include a scan head contained within a flatbed chamber. An automatic document feeder (ADF) window may also be used to perform a simplex scan or a duplex scan with a re-circulating paper path. It is desired that the vertical dimension of such scan heads is small enough to minimize the size of the scan head. Alternatively, a scanner may employ a scan head that is positioned along a media path of an ADF as is known in the art. It is often desired that the horizontal dimension of such scan heads is also compact. Accordingly, it will be appreciated that an optical system that achieves compact dimensions for a scanner while maintaining high optical image quality is desired. As a result, it will be appreciated that a scan head that achieves high image quality while being relatively easy to manufacture is also desired.

SUMMARY OF THE DISCLOSURE

An optical system for a scanner according to one example embodiment includes a light source for illuminating a target area to be scanned and a plurality of mirrors. The plurality of mirrors includes a first mirror positioned to receive a light beam traveling along a first optical path between the target area and the first mirror when the target area is illuminated by the light source and to reflect the light beam along a second optical path between the first mirror and a second mirror. The second mirror is positioned to receive the light beam traveling along the second optical path and to reflect the light beam along a third optical path between the second mirror and a third mirror. The third optical path crosses the first optical path. The third mirror is positioned to receive the light beam traveling along the third optical path and to reflect the light beam along a fourth optical path between the third mirror and a fourth mirror. The fourth optical path crosses the first optical path. The fourth mirror is positioned to receive the light beam traveling along the fourth optical path and to reflect the light beam along a fifth optical path between the fourth mirror and a fifth mirror. The fifth optical path crosses the second and third optical paths. The fifth mirror is positioned to receive the light beam traveling along the fifth optical path and to reflect the light beam along a sixth optical path between the fifth mirror and an image sensor. The sixth optical path crosses the first and second optical paths. The image sensor is positioned to receive the light beam traveling along the sixth optical path and to sense an image of the target area.

Embodiments include those wherein the first optical path is substantially parallel to the fifth optical path, the fourth optical path is substantially parallel to the sixth optical path, and the first and fifth optical paths are substantially perpendicular to the fourth and sixth optical paths. In some embodiments, the first mirror is positioned vertically furthest from the target area among the plurality of mirrors.

BRIEF DESCRIPTION OF THE DRAWINGS

The above-mentioned and other features and advantages of the present disclosure, and the manner of attaining them, will become more apparent and will be better understood by reference to the following description of embodiments of the disclosure taken in conjunction with the accompanying drawings, wherein.

DETAILED DESCRIPTION

It is to be understood that various omissions and substitutions of equivalents are contemplated as circumstances may suggest or render expedient, but these are intended to cover the application or implementation without departing from the spirit or scope of the claims of the present disclosure. It is to be understood that the present disclosure is not limited in its application to the details of components set forth in the following description. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the terms "a" and "an" herein do not denote a limitation of quantity, but rather denote the presence of at least one of the referenced item.

The present disclosure provides an optical system for a scanner that includes a light source, an arrangement of a plurality of mirrors, and an image sensor. This arrangement achieves compact dimensions for the scanner. The term "dimension" as used herein, may relate to horizontal dimension and/or vertical dimension of the scanner, e.g., length, width and/or height of the scanner. As used herein, the terms horizontal and vertical are relative to the orientation of a target area to be scanned. The vertical direction is orthogonal to the target area and the horizontal direction is parallel to the target area. For example, the target area may be disposed on a substantially horizontal flatbed portion of a conventional scanner such that the vertical direction is substantially vertical with respect to the ground and the horizontal direction is substantially horizontal with respect to the ground when the scanner is placed on a flat surface. However, alternatives include those wherein the target area is disposed in an orientation other than horizontal such that vertical direction is not vertical with respect to the ground and the horizontal direction is not horizontal with respect to the ground. For example, the target area may be positioned in an orientation other than horizontal in the body of an automatic document feeder as is known in the art.

Figure 1:
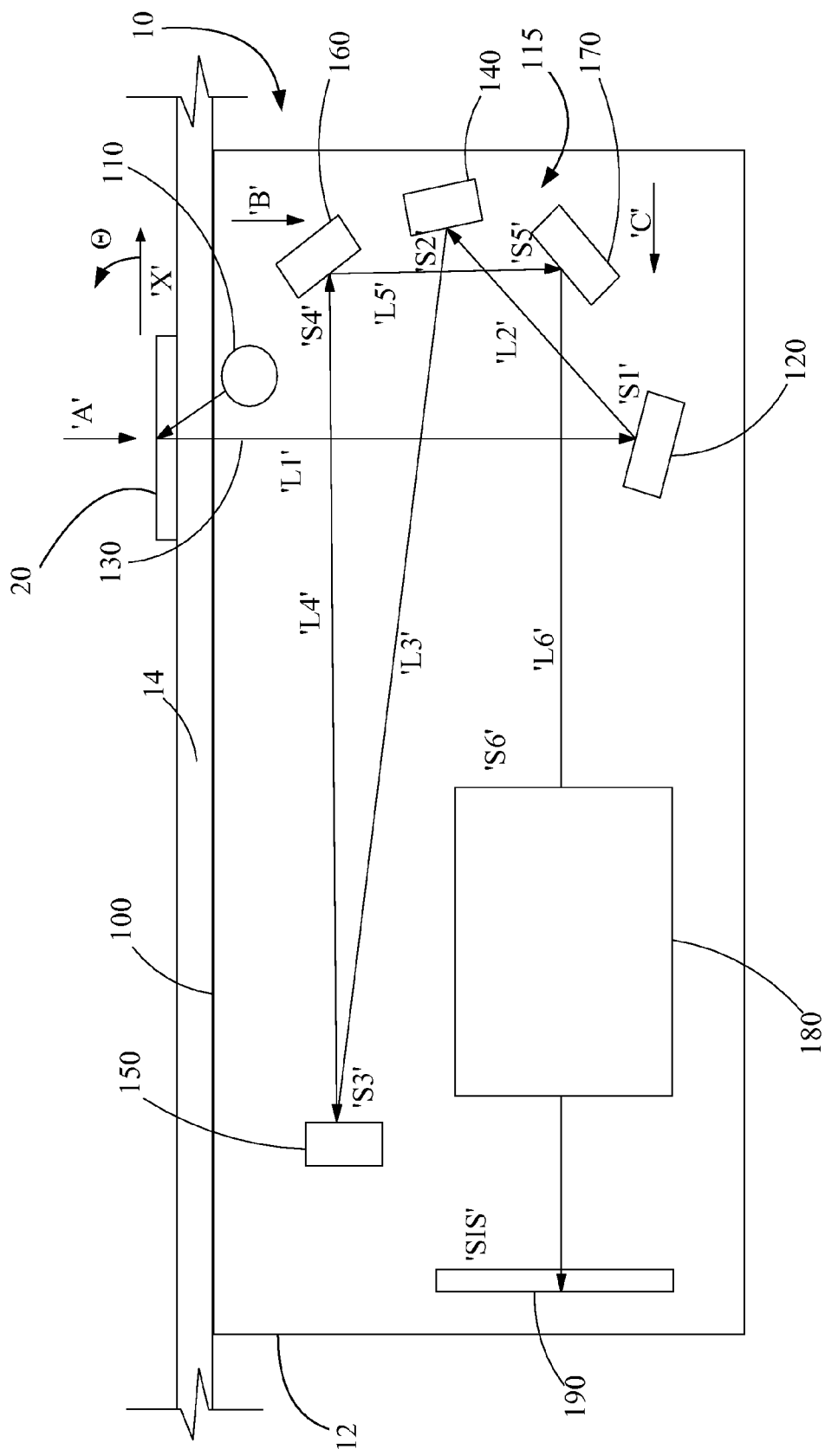
FIG. 1 depicts a layout of an optical system for a scanner according to one example embodiment.

FIG. 1 depicts a layout of an optical system 100 for a scanner, according to one example embodiment. In this embodiment, the scanner is a flatbed scanner that includes a scan head 10 having a housing 12. In this embodiment, during a scanning operation, scan head 10 moves across a target area 20, such as a document, to be scanned with the drive of a driving unit (not shown), such as a stepper motor, to read image information of target area 20. The scanner includes a scanning window 14 for carrying the document thereon during the scanning operation. Scanning window 14 may be made of a substantially transparent material (such as a glass material) as known in the art. Alternatives include those wherein scan head 10 is mounted in a stationary manner, such as along a media path of an automatic document feeder, as is known in the art. For the purpose of this description, FIG. 1 has been depicted to illustrate optical system 100 of scan head 10. However, it should be understood that the scanner may include other components, such as control circuitry, a cooling fan and the like that have not been shown for the sake of simplicity.

Optical system 100 includes at least one light source 110 to illuminate target area 20 for scanning. It will be appreciated that optical system 100 may include one or more than one light source 110 based on a manufacturer's preferences. Light source 110 may be a lamp such as a fluorescent lamp, a halogen lamp, and other such lamps known in the art. Optical system 100 may also include a reflector (not shown) to reflect a light beam from light source 110 to efficiently illuminate target area 20.

Optical system 100 includes a mirror assembly 115. Mirror assembly 115 includes a first mirror 120 spaced from target area 20 in a substantially vertical direction 'A'. First mirror 120 receives a light beam 130 from target area 20 when target area 20 is illuminated with light source 110. Specifically, light beam 130 is reflected along an optical path 'L1' and strikes at an incident surface 'S1' of first mirror 120. In some embodiments, the length of optical path 'L1' is between about 36.0 mm and about 46.0 mm and in one embodiment is about 41.0 mm. In some embodiments, incident surface 'S1' forms an angle '$\Theta 1$' of between about 149.5° and about 159.5° relative to target area 20 and in one embodiment forms an angle of about 154.5° relative to target area 20. As used herein, angles '$\Theta$' are measured relative to a horizontal vector 'X' defined by target area 20 in the direction indicated in FIG. 1. Light beam 130 corresponds to an image of target area 20 to be scanned. In some embodiments, first mirror 120 is substantially horizontally aligned with target area 20 such that optical path 'L1' is substantially vertical. First mirror 120 reflects light beam 130 to a second mirror 140 that receives light beam 130 from first mirror 120 along an optical path 'L2.' In some embodiments, the length of optical path 'L2' is between about 18.0 mm and about 28.0 mm and in one embodiment is about 23.0 mm. Light beam 130 strikes at an incident surface 'S2' of second mirror 140. In some embodiments, incident surface 'S2' forms an angle '$\Theta 2$' of between about 100.4° and about 110.4° relative to target area 20 and in one embodiment forms an angle of about 105.4° relative to target area 20. Further, second mirror 140 reflects the received light beam 130 across optical path 'L1' between first mirror 120 and document 20.

Mirror assembly 115 includes a third mirror 150 positioned in proximity to scanning window 14. Third mirror 150 receives light beam 130 from second mirror 140. Specifically, light beam 130 is reflected along an optical path 'L3' from second mirror 140 to third mirror 150. In some embodiments, the length of optical path 'L3' is between about 42.1 mm and about 62.1 mm and in one embodiment is about 52.1 mm. Light beam 130 strikes at an incident surface 'S3' of third mirror 150. In some embodiments, incident surface 'S3' forms an angle '$\Theta 3$' of between about 80.9° and about 90.9° relative to target area 20 and in one embodiment forms an angle of about 85.9° relative to target area 20. Third mirror 150 reflects received light beam 130 across optical path 'L1' between first mirror 120 and target area 20. In some embodiments, third mirror 150 converges light beam 130 being reflected therefrom. Embodiments include those wherein third mirror 150 is an adjustable mirror, i.e., the position of third mirror 150 may be adjusted in order to accommodate larger lens magnification error.

Mirror assembly 115 also includes a fourth mirror 160 positioned adjacent to second mirror 140 and substantially opposite third mirror 150 for receiving light beam 130 reflected from third mirror 150. Specifically, light beam 130 is reflected along an optical path 'L4' from third mirror 150 to fourth mirror 160. In some embodiments, the length of optical path 'L4' is between about 37.1 mm and about 57.1 mm and in one embodiment is about 47.1 mm. In some embodiments optical path 'L4' is substantially horizontal. Light beam 130 strikes at an incident surface 'S4' of fourth mirror 160. In some embodiments, incident surface 'S4' forms an angle '$\Theta 4$' of between about 130.0° and about 140.0° relative to target area 20 and in one embodiment forms an angle of about 135.0° relative to target area 20. In some embodiments, light beam 130 striking fourth mirror 160 is substantially narrower than light beams 130 striking first mirror 120 and second mirror 140, respectively, thereby allowing fourth mirror 160 to be substantially narrower than first and second mirrors 120, 140. This reduces the space necessary for scan head 10. Fourth mirror 160 reflects light beam 130 across optical path 'L2' between first mirror 120 and second mirror 140 and across optical path 'L3' between second mirror 140 and third mirror 150.

Mirror assembly 115 includes a fifth mirror 170 positioned adjacent to second mirror 140 and in a substantially vertical direction 'B' from fourth mirror 160 such that second mirror 140 is set between fourth mirror 160 and fifth mirror 170. Fifth mirror 170 receives light beam 130 reflected from fourth mirror 160. Specifically, light beam 130 is reflected along an optical path 'L5' from fourth mirror 160 to fifth mirror 170. In some embodiments, the length of optical path 'L5' is between about 11.6 mm and about 21.6 mm and in one embodiment is about 16.6 mm. Light beam 130 strikes at an incident surface 'S5' of fifth mirror 170. In some embodiments, incident surface 'S5' forms an angle '$\Theta 5$' of between about 40.0° and about 50.0° relative to target area 20 and in one embodiment an angle of about 45.0° relative to target area 20. In some embodiments, fifth mirror 170 is substantially horizontally aligned with fourth mirror 160 such that optical path 'L5' is substantially vertical. Fifth mirror 170 reflects the received light beam 130 across optical path 'L1' between first mirror 120 and target area 20 and across optical path 'L2' between first mirror 120 and second mirror 140.

In some embodiments, optical system 100 also includes an imaging lens unit 180 positioned in a substantially horizontal direction 'C' from fifth mirror 170. Lens unit 180 receives light beam 130 reflected from fifth mirror 170. Specifically, light beam 130 is reflected along an optical path 'L6' from fifth mirror 170 to imaging lens unit 180, and more particularly, to an incident surface 'S6' of imaging lens unit 180. In some embodiments, incident surface 'S6' forms an angle 'Θ6' of between about 85.0° and about 95.0° relative to target area 20 and in one embodiment an angle of about 90.0° relative to target area 20. In some embodiments, lens unit 180 is substantially vertically aligned with fifth mirror 170 such that optical path 'L6' is substantially horizontal. Imaging lens unit 180 includes one or more lenses.

Optical system 100 includes an image sensor 190 positioned adjacent to imaging lens unit 180. In some embodiments, image sensor 190 includes an incident surface 'SIS' that forms an angle 'ΘIS' of between about 85.0° and about 95.0° relative to target area 20 and in one embodiment an angle of about 90.0° relative to target area 20. Image sensor 190 senses an image formed by imaging lens unit 180 on image sensor 190. The image is formed by focusing received light beam 130 on image sensor 190. The image corresponds to target area 20. In some embodiments, the length of an optical path from fifth mirror 170 to image sensor 190 is between about 51.2 mm and about 61.2 mm and in one embodiment this length is about 56.2 mm. Image sensor 190 may be in the form of a charge-coupled device array and may serve as a reading means. Optical system 100 may also include a filter (not shown) adjacent to imaging lens unit 180 in order to filter light beam 130 focused by imaging lens unit 180 on image sensor 190.

As depicted in FIG. 1, first mirror 120 is positioned vertically farthest from target area 20 among the plurality of mirrors and in proximity to imaging lens unit 180. The distance between first mirror 120 and target area 20 reduces the visibility of dust on first mirror 120 as light beam 130 may be more defocused when striking at incident surface 'S1' of first mirror 120.

First mirror 120, second mirror 140, fourth mirror 160 and fifth mirror 170 may be mounted with a common first bracket (not shown) positioned within housing 12 of scanner 10. Third mirror 150 may be mounted with a second bracket (not shown) positioned opposite the first bracket within housing 12 of scan head 10. One or more of the plurality of mirrors, such as third mirror 150, may be slightly curved to focus reflected light beam 130 onto a respective smaller surface of a consecutive mirror, such as fourth mirror 160.

As depicted in FIG. 1, optical path 'L6' between fifth mirror 170 and imaging lens unit 180 is substantially parallel to optical path 'L4' between third mirror 150 and fourth mirror 160. Further, optical path 'L6' between fifth mirror 170 and imaging lens unit 180 is substantially perpendicular to optical path 'L5' between fourth mirror 160 and fifth mirror 170 and optical path 'L1' between target area 20 and first mirror 120. Similarly, optical path 'L4' between third mirror 150 and fourth mirror 160 is substantially perpendicular to optical path 'L5' between fourth mirror 160 and fifth mirror 170 and optical path 'L1' between target area 20 and first mirror 120. Specifically, a plane connecting image sensor 190, imaging lens unit 180, and fifth mirror 170 is substantially parallel to a plane connecting third mirror 150 and fourth mirror 160 and to the plane of target area 20. By using optical paths that are substantially perpendicular or substantially parallel to each other, this arrangement reduces the complexity associated with aligning the mirrors.

For the purpose of this description, only one light beam has been depicted. However, it will be appreciated that more than one light beam may be reflected in the above described sequence, e.g., from target area 20 to first mirror 120, then to second mirror 140, then to third mirror 150, then to fourth mirror 160, then to fifth mirror 170, and finally to imaging lens unit 180.

In use, a document to be scanned may be placed over scanning window 14. When power is provided to the scanner to perform a scanning operation, light source 110 illuminates target area 20 and the document. Subsequently, light beam 130 strikes at incident surface 'S1' of first mirror 120 along optical path 'L1.' Light beam 130 is reflected from first mirror 120 onto incident surface 'S2' of second mirror 140 along optical path 'L2.' Light beam 130 is then reflected from second mirror 140 onto incident surface 'S3' of third mirror 150 along optical path 'L3.' Light beam 130 is then reflected from third mirror 150 onto incident surface 'S4' of fourth mirror 160 along optical path 'L4.' Light beam 130 is then reflected from fourth mirror 160 onto incident surface 'S5' of fifth mirror 170 along optical path 'L5.' Light beam 130 is then reflected from fifth mirror 170 onto incident surface 'S6' of imaging lens unit 180 that focuses light beam 130 for forming the image on image sensor 190.

Figure 2:
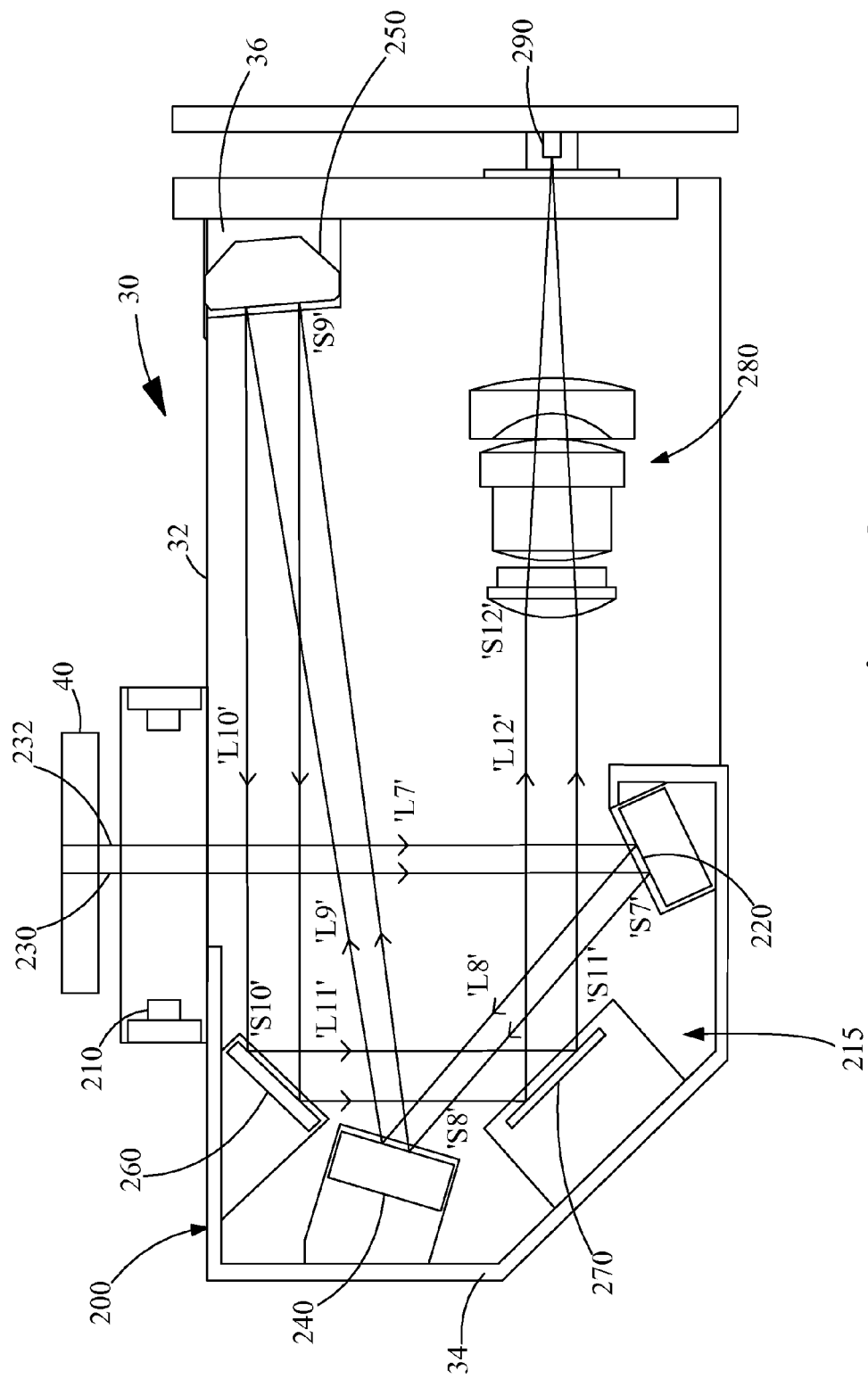
FIG. 2 depicts an example design for a charge-coupled device module that employs the optical system.

FIG. 2 depicts an example design for a charge-coupled device module (CCDM) 30 of a scanner that employs an optical system 200. CCDM 30 has a housing 32 that includes optical system 200 therein.

Optical system 200 is similar to optical system 100 of FIG. 1 and includes at least one light source, such as a light source 210 similar to light source 110 of optical system 100, to illuminate a target area 40, such as a document, to be scanned. Optical system 200 includes a mirror assembly 215. Mirror assembly 215 includes a first mirror 220 similar to first mirror 120 and spaced from target area 40 in a substantially vertical direction, a second mirror 240 similar to second mirror 140, a third mirror 250 similar to third mirror 150, a fourth mirror 260 similar to fourth mirror 160 and positioned adjacent to second mirror 240 and substantially opposite third mirror 250, and a fifth mirror 270 similar to fifth mirror 170 and positioned adjacent to second mirror 240 and in a substantially vertical direction from fourth mirror 260. Optical system 200 also includes an imaging lens unit 280 positioned in a substantially horizontal direction from fifth mirror 270. Imaging lens unit 280 is similar to imaging lens unit 180 and includes one or more lenses. Further, optical system 200 includes an image sensor 290 (such as a charge-coupled device array) positioned adjacent to imaging lens unit 280. Image sensor 290 senses an image formed by imaging lens unit 280 on image sensor 290 that corresponds with target area 40.

First mirror 220 is positioned vertically farthest from target area 40 and in proximity to imaging lens unit 280. Further, first mirror 220, second mirror 240, fourth mirror 260 and fifth mirror 270 are mounted with a first bracket 34 positioned within housing 32 of CCDM 30 of the scanner. Third mirror 250 is mounted with a second bracket 36 positioned opposite first bracket 34 within housing 32. Third mirror 250 is an adjustable mirror, i.e., the position of third mirror 250 may be adjusted in order to accommodate larger lens magnification error. In some embodiments, third mirror 250 is adjustable relative to second mounting bracket 36. Alternatives include those wherein second mounting bracket 36 is adjustable relative to housing 32.

As depicted in FIG. 2, light beams 230 and 232 strike at an incident surface 'S7' of first mirror 220 along an optical path 'L7,' when target area 40 is illuminated with light source 210. First mirror 220 then reflects light beams 230 and 232 along an optical path 'L8' such that light beams 230 and 232 strike at an incident surface 'S8' of second mirror 240. Thereafter, second mirror 240 reflects light beams 230 and 232 along an optical path 'L9' such that light beams 230 and 232 strike at an incident surface 'S9' of third mirror 250. Third mirror 250 reflects light beams 230 and 232 along an optical path 'L10' such that light beams 230 and 232 strike at an incident surface 'S10' of fourth mirror 260. Thereafter, fourth mirror 260 reflects light beams 230 and 232 along an optical path 'L11' such that light beams 230 and 232 strike at an incident surface 'S11' of fifth mirror 270. Subsequently, fifth mirror 270 reflects light beams 230 and 232 along an optical path 'L12' such that light beams 230 and 232 strike at an incident surface 'S12' of imaging lens unit 280 that forms an image corresponding to target area 40 on image sensor 290 by focusing light beams 230 and 232 onto image sensor 290.

By positioning first mirror 220 away from a plane of target area 40 dust visibility on first mirror 220 is reduced as light beams 230 and 232 may be more defocused when striking at incident surface 'S7' of first mirror 220. As depicted in FIG. 2, optical path 'L12' between fifth mirror 270 and imaging lens unit 280 is substantially parallel to optical path 'L10' between third mirror 250 and fourth mirror 260. Optical path 'L12' between fifth mirror 270 and imaging lens unit 280 is substantially perpendicular to optical path 'L11' between fourth mirror 260 and fifth mirror 270 and optical path 'L7' between target area 40 and first mirror 220. Similarly, optical path 'L10' between third mirror 250 and fourth mirror 260 is substantially perpendicular to optical path 'L11' between fourth mirror 260 and fifth mirror 270 and optical path 'L7' between target area 40 and first mirror 220. Specifically, a plane connecting image sensor 290, imaging lens unit 280, and fifth mirror 270 is substantially parallel to a plane connecting third mirror 250 and fourth mirror 260 and to the plane of target area 40. As discussed above, such an arrangement reduces the complexity associated with aligning the plurality of mirrors.

Light beams 230 and 232 striking fourth mirror 260 are substantially narrower than light beams 230 and 232 striking first mirror 220 and second mirror 240 thereby allowing fourth mirror 260 to be substantially narrower than first and second mirrors 220, 240. Accordingly, a scanner utilizing CCDM 30 that includes optical system 200 may be manufactured to have reduced vertical and horizontal dimensions in comparison with conventional scan heads.

Based on the foregoing, the present disclosure provides an optical system (such as optical systems 100 and 200) that achieves compact dimensions for a scan head employing the optical system while maintaining high optical image quality. In other words, a compact scan head having a reduced length and a reduced width in comparison with a conventional scan head may be obtained by employing the optical system of the present disclosure. Further, the arrangement of the plurality of mirrors, the imaging lens unit and the image sensor with respect to a document to be scanned reduces the manufacturing complexity associated with aligning the various imaging components relative to one another.

The foregoing description of several embodiments of the present disclosure has been presented for purposes of illustration. It is not intended to be exhaustive or to limit the disclosure to the precise forms disclosed, and obviously many modifications and variations are possible in light of the above teaching. It is intended that the scope of the disclosure be defined by the claims appended hereto.

What is claimed is:

1. An optical system for a scanner, comprising
a light source for illuminating a target area to be scanned;
a plurality of mirrors that includes:
  a first mirror spaced vertically from the target area and positioned to receive a light beam traveling along a first optical path between the target area and the first mirror when the target area is illuminated by the light source and to reflect the light beam along a second optical path between the first mirror and a second mirror, the first mirror having a first incident surface that forms an angle of between about 149.5° and about 159.5° relative to the target area;
  the second mirror being positioned to receive the light beam traveling along the second optical path and to reflect the light beam along a third optical path between the second mirror and a third mirror, the third optical path crossing the first optical path, the second mirror having a second incident surface that forms an angle of between about 100.4° and about 110.4° relative to the target area;
  the third mirror being positioned to receive the light beam traveling along the third optical path and to reflect the light beam along a fourth optical path between the third mirror and a fourth mirror, the fourth optical path crossing the first optical path, the third mirror having a third incident surface that forms an angle of between about 80.9° and about 90.9° relative to the target area;
  the fourth mirror being positioned to receive the light beam traveling along the fourth optical path and to reflect the light beam along a fifth optical path between the fourth mirror and a fifth mirror, the fifth optical path crossing the second and third optical paths, the fourth mirror having a fourth incident surface that forms an angle of between about 130.0° and about 140.0° relative to the target area; and
  the fifth mirror being positioned to receive the light beam traveling along the fifth optical path and to reflect the light beam along a sixth optical path between the fifth mirror and an image sensor, the sixth optical path crossing the first and second optical paths, the fifth mirror having a fifth incident surface that forms an angle of between about 40.0° and about 50.0° relative to the target area; and
the image sensor being positioned to receive the light beam traveling along the sixth optical path and to sense an image of the target area, the image sensor having a sixth incident surface that forms an angle of between about 85.0° and about 95.0° relative to the target area.

2. The optical system of claim 1, wherein the first optical path is substantially parallel to the fifth optical path.

3. The optical system of claim 1, wherein the fourth optical path is substantially parallel to the sixth optical path.

4. The optical system of claim 1, wherein the first optical path is substantially perpendicular to the fourth optical path.

5. The optical system of claim 1, wherein the first optical path is substantially perpendicular to the sixth optical path.

6. The optical system of claim 1, wherein the fifth optical path is substantially perpendicular to the fourth optical path.

7. The optical system of claim 1, wherein the fifth optical path is substantially perpendicular to the sixth optical path.

8. The optical system of claim 1, wherein the first mirror is positioned vertically furthest from the target area among the plurality of mirrors.

9. The optical system of claim 1, wherein the fourth mirror is narrower than the first and second mirrors.

10. The optical system of claim 1, wherein the first, second, fourth and fifth mirrors are mounted on a common bracket.

11. The optical system of claim 10, wherein the common bracket is positioned within a housing and the third mirror is mounted on a second bracket that is disposed on an opposite side of the housing from the common bracket.

12. The optical system of claim 1, wherein the third mirror is adjustably positioned relative the remaining plurality of mirrors.

13. The optical system of claim 1, wherein a length of the first optical path is between 36.0 mm and about 46.0 mm, a length of the second optical path is between about 18.0 mm and about 28.0 mm, a length of the third optical path is between about 42.1 mm and about 62.1 mm, a length of the fourth optical path is between about 37.1 mm and about 57.1 mm, a length of the fifth optical path is between about 11.6 mm and 21.6 mm, and a length of the sixth optical path is between about 51.2 mm and about 61.2 mm.

14. The optical system of claim 1, wherein:
the first incident surface forms an angle of about 154.5° relative to the target area;
the second incident surface forms an angle of about 105.4° relative to the target area;
the third incident surface forms an angle of about 85.9° relative to the target area;
the fourth incident surface forms an angle of about 135.0° relative to the target area;
the fifth incident surface forms an angle of about 45.0° relative to the target area; and
the sixth incident surface forms an angle of about 90.0° relative to the target area.

15. An optical system for a scanner, comprising:
a light source for illuminating a target area to be scanned;
a plurality of mirrors that includes:
a first mirror spaced vertically from the target area and positioned to receive a light beam traveling along a first optical path between the target area and the first mirror when the target area is illuminated by the light source and to reflect the light beam along a second optical path between the first mirror and a second mirror, the first mirror having a first incident surface that forms an angle of between about 149.5° and about 159.5° relative to the target area;
the second mirror being positioned to receive the light beam traveling along the second optical path and to reflect the light beam along a third optical path between the second mirror and a third mirror, the third optical path crossing the first optical path, the second mirror having a second incident surface that forms an angle of between about 100.4° and about 110.4° relative to the target area;
the third mirror being positioned to receive the light beam traveling along the third optical path and to reflect the light beam along a fourth optical path between the third mirror and a fourth mirror, the fourth optical path crossing the first optical path and being substantially perpendicular to the first optical path, the third mirror having a third incident surface that forms an angle of between about 80.9° and about 90.9° relative to the target area;
the fourth mirror being positioned to receive the light beam traveling along the fourth optical path and to reflect the light beam along a fifth optical path between the fourth mirror and a fifth mirror, the fifth optical path crossing the second and third optical paths and being substantially parallel to the first optical path and substantially perpendicular to the fourth optical path, the fourth mirror having a fourth incident surface that forms an angle of between about 130.0° and about 140.0° relative to the target area; and
the fifth mirror being positioned to receive the light beam traveling along the fifth optical path and to reflect the light beam along a sixth optical path between the fifth mirror and an image sensor, the sixth optical path crossing the first and second optical paths and being substantially parallel to the fourth optical path and substantially perpendicular to the first and fifth optical paths, the fifth mirror having a fifth incident surface that forms an angle of between about 40.0° and about 50.0° relative to the target area; and
the image sensor being positioned to receive the light beam traveling along the sixth optical path and to sense an image of the target area, the image sensor having a sixth incident surface that forms an angle of between about 85.0° and about 95.0° relative to the target area.

16. The optical system of claim 15, wherein a length of the first optical path is between 36.0 mm and about 46.0 mm, a length of the second optical path is between about 18.0 mm and about 28.0 mm, a length of the third optical path is between about 42.1 mm and about 62.1 mm, a length of the fourth optical path is between about 37.1 mm and about 57.1 mm, a length of the fifth optical path is between about 11.6 mm and 21.6 mm, and a length of the sixth optical path is between about 51.2 mm and about 61.2 mm.

17. An optical system for a scanner, comprising
a light source for illuminating a target area to be scanned;
a plurality of mirrors that includes:
a first mirror spaced vertically from the target area and positioned to receive a light beam traveling along a first optical path between the target area and the first mirror when the target area is illuminated by the light source and to reflect the light beam along a second optical path between the first mirror and a second mirror, the first mirror having a first incident surface that forms an angle of between about 149.5° and about 159.5° relative to the target area;
the second mirror being positioned to receive the light beam traveling along the second optical path and to reflect the light beam along a third optical path between the second mirror and a third mirror, the second mirror having a second incident surface that forms an angle of between about 100.4° and about 110.4° relative to the target area;
the third mirror being positioned to receive the light beam traveling along the third optical path and to reflect the light beam along a fourth optical path between the third mirror and a fourth mirror, the third mirror having a third incident surface that forms an angle of between about 80.9° and about 90.9° relative to the target area;
the fourth mirror being positioned to receive the light beam traveling along the fourth optical path and to reflect the light beam along a fifth optical path between the fourth mirror and a fifth mirror, the fourth mirror having a fourth incident surface that forms an angle of between about 130.0° and about 140.0° relative to the target area; and
the fifth mirror being positioned to receive the light beam traveling along the fifth optical path and to reflect the light beam along a sixth optical path between the fifth mirror and an image sensor, the fifth mirror having a fifth incident surface that forms an angle of between about 40.0° and about 50.0° relative to the target area; and the image sensor being positioned to receive the light beam traveling along the sixth optical path and to sense an image of the target area, the image sensor having a sixth incident surface that forms an angle of between about 85.0° and about 95.0° relative to the target area, wherein the first mirror is positioned vertically furthest from the target area among the plurality of mirrors.

18. The optical assembly of claim 17, wherein the first optical path is substantially parallel to the fifth optical path, the fourth optical path is substantially parallel to the sixth optical path, and the first and fifth optical paths are substantially perpendicular to the fourth and sixth optical paths.

* * * * *